United States Patent [19]
Yasugaki

[11] Patent Number: 5,530,586
[45] Date of Patent: Jun. 25, 1996

[54] IMAGE DISPLAY APPARATUS

[75] Inventor: Masato Yasugaki, Kunitachi, Japan

[73] Assignee: Olympus Optical Co., Ltd., Tokyo, Japan

[21] Appl. No.: 354,078

[22] Filed: Dec. 6, 1994

[30] Foreign Application Priority Data

Dec. 7, 1993 [JP] Japan ................................. 5-306506

[51] Int. Cl.⁶ .............................. G02B 17/00; G02B 5/30; G02B 27/14
[52] U.S. Cl. ...................... 359/364; 359/495; 359/496; 359/501; 359/629; 359/630
[58] Field of Search ........................... 359/495, 496, 359/501, 629, 630, 631, 869, 364

[56] References Cited

U.S. PATENT DOCUMENTS

| 3,677,621 | 7/1972 | Smith | 359/495 |
| 4,082,432 | 4/1978 | Kirschner | 359/631 |
| 4,383,740 | 5/1983 | Bordovsky | 359/631 |
| 4,799,763 | 1/1989 | Davis et al. | 359/472 |
| 5,305,124 | 4/1994 | Chern et al. | 359/631 |

FOREIGN PATENT DOCUMENTS 3-191389  8/1991  Japan .

*Primary Examiner*—Paul M. Dzierzynski
*Assistant Examiner*—Mohammad Y. Sikder
*Attorney, Agent, or Firm*—Cushman, Darby & Cushman

[57] ABSTRACT

A compact wide-view angle image display apparatus which displays an image by using an optical system. A lens unit (L1) is disposed on the optical axis (A1) of an LCD (11). A magnifying reflecting mirror (12) is disposed on an optical axis (A2) perpendicularly intersecting the optical axis (A1). A half-mirror surface (13) is disposed at a tilt on the intersection point of the optical axis (A1) and the optical axis (A2) so that the half-mirror surface (13) reflects a bundle of rays from the LCD (11) to the reflecting mirror (12) and transmits the ray bundle reflected from the reflecting mirror (12). A magnifying reflecting mirror (14) is disposed to face the reflecting mirror (12). A half-mirror surface (15) is disposed at a tilt on the intersection point of the optical axis (A2) and an observer's visual axis (AE) so that the half-mirror surface (15) transmits the ray bundle reflected from the reflecting mirror (12) to the reflecting mirror (14) and reflects the ray bundle reflected from the reflecting mirror (14) to project it into an observer's eyeball. A lens unit (L2) of positive power is disposed between the half-mirror surface (15) and the eyeball.

8 Claims, 8 Drawing Sheets

20 Face-mounted goggle type

Headband

IMAGE DISPLAY APPARATUS

BACKGROUND OF THE INVENTION

1. Field of the Invention

The present invention relates to an image display apparatus and, more particularly, to a compact head- or face-mounted image display apparatus which is retained on the user's head or face to project an image into his or her eyeball.

2. Background of the Related Art

In recent years, helmet- and goggle-type head- or face-mounted image display apparatuses, which are designed to be retained on the user's head or face, have been developed for the purpose of enabling the user to enjoy virtual reality or a wide-screen image by oneself.

A typical image display apparatus of the type described above is composed of an image display device, e.g., a liquid crystal display device (LCD), and an optical system for projecting an image formed by the image display device into an observer's eyeball. There are two ways of widening the view angle of the image display apparatus: one in which the focal length of the optical system is shortened; and another in which the size of the image display device is increased.

However, if the size of the image display device is increased to widen the view angle, the overall size of the image display apparatus increases, so that the load imposed on the user when wearing the apparatus on his or her head increases. Thus, this method is unfavorable from the viewpoint of practical use. Accordingly, to widen the view angle by using a compact optical system, the power of the entire optical system must be increased.

FIG. 12 shows one example of conventional projection optical systems [e.g., Japanese Patent Application Laid-Open (KOKAI) No. 3-191389 (1991)]. The optical system includes an LCD 1 for displaying an image, and a half-mirror surface 2 which is disposed at a tilt on the intersection point of the optical axis of the LCD 1 and an observer's visual axis to lead a bundle of rays from the image formed by the LCD 1 to an observer's eyeball E. The optical system further includes a concave mirror 3 of positive power which is disposed to face the LCD 1 across the half-mirror surface 2. The half-mirror surface 2 and the concave mirror 3 are integrated into a prism 4. This type of optical system is known to be capable of displaying an image of good quality with a compact structure.

To widen the viewing angle of the above-described optical system, it is necessary to increase the power of the optical system, as described above. One method of increasing the power of the optical system is to reduce the curvature of the concave mirror 3. It is also possible to adopt a method wherein, as shown in FIG. 13, a lens 5 of positive power is disposed between the eyeball E and the half-mirror surface 2 [see Japanese Patent Application No. 5-35212 (1993)].

However, as the power of the concave mirror 3 or the power of the lens 5, which is disposed between the eyeball E and the half-mirror surface 2, is increased, the object surface where the LCD 1 should be disposed comes closer to the concave mirror 3. Eventually, it becomes impossible to dispose the LCD 1 because of interference with the prism 4.

Thus, when an LCD having a diagonal of about 1.3 inches and a height-to-width ratio of 3:4 is used as the image display device 1, the horizontal viewing angle of 45° is the widest angle attainable for the above-described optical system by the conventional technique of widening the viewing angle.

SUMMARY OF THE INVENTION

In view of the above-described problems of the background art, an object of the present invention is to provide a compact wide-view angle image display apparatus which displays a more advantageous image by using an optical system.

To attain the above-described object, the present invention provides an image display apparatus having an image display device for forming an image, and a projection optical system for projecting the image into an observer's eyeball. The projection optical system has a first lens unit disposed on the optical axis of the image display device, at least two reflecting mirrors disposed on an optical path closer to the observer's eyeball than the first lens unit, and at least one semitransparent mirror provided at a position where the optical axes of the at least two reflecting mirrors connect with each other. The first lens unit and the reflecting mirror of the at least two reflecting mirrors that is provided on an optical path closest to the first lens unit constitute a relay optical system for re-forming the image formed by the image display device.

It should be noted that the term "optical axis of reflecting mirror" in the above description means either an optical axis incident on a reflecting mirror or an optical axis reflected by it.

By virtue of the above-described arrangement of the present invention, the image displayed by the image display device is formed as a real image in the optical path by the relay optical system. By disposing an element of positive power between the real image forming position and the observer's eyeball, the image of the image display device, which is formed in the optical path, can be projected into the eyeball as an enlarged image.

In this case, as the power of the element of positive power, which is disposed between the imagery position of the image display device and the eyeball, is increased, the imagery position of the image display device comes closer to the eyeball. In the present invention, however, it is possible to widen the viewing angle of the projection optical system without any problem simply by changing the relay optical system disposed between the image display device and the imagery position thereof.

Further, use of reflecting mirrors enables the optical path to be lengthened without increasing the overall length of the optical system and also makes it possible to avoid interference between the image display device and the semitransparent mirror. If magnifying reflecting mirrors are used, aberration correction can be made even more effectively.

Further, since a semitransparent mirror is interposed in the optical path, the constituent elements can be arranged so that the axial chief ray that emanates from the center of the image display device perpendicularly to the plane of the image display device is perpendicularly incident on the centers of the first and second reflecting mirrors. Thus, all the optical elements, including the first and second reflecting mirrors, can be arranged as a substantially coaxial optical system. Accordingly, the optical system of the present invention is free from coma and astigmatism as occurs on account of a decentered arrangement of reflecting mirrors as in the conventional reflecting optical systems (e.g., U.S. Pat. No. 4,383,740), and provides an image of good quality which is clear as far as the edges of visual field.

It should be noted that the present invention includes the following arrangements:

A pair of first and second reflecting mirrors are disposed to face each other on a second optical axis which intersects the optical axis of the image display device, and a semitransparent mirror is disposed at a tilt on the intersection point of the optical axis of the image display device and the second optical axis so that the semitransparent mirror reflects a bundle of rays from the image display device to the first reflecting mirror, transmits the ray bundle reflected from the first reflecting mirror to the second reflecting mirror, and reflects the ray bundle reflected from the second reflecting mirror so as to project it into the observer's eyeball.

Alternatively, the first reflecting mirror is disposed to face the image display device, while the second reflecting mirror is disposed on the observer's visual axis intersecting the optical axis of the image display device, and a semitransparent mirror is disposed at a tilt on the intersection point of the optical axes of the first and second reflecting mirrors so that the semitransparent mirror transmits a bundle of rays from the image display device to the first reflecting mirror, reflects the ray bundle reflected from the first reflecting mirror to the second reflecting mirror, and transmits the ray bundle reflected from the second reflecting mirror so as to project it into the observer's eyeball.

When two semitransparent mirrors are used, light rays emanating from the image display device pass through the semitransparent mirrors a total of four times before entering the eyeball, whereas, when only one semitransparent mirror is used, the number of times the light rays emanating from the image display device pass through the semitransparent mirror before entering the eyeball can be reduced to three times. Therefore, by reducing the number of semitransparent mirrors from 2 to 1, the intensity of the image-projecting ray bundle that enters the observer's eyeball can be approximately doubled. In addition, the overall size of the optical system can be reduced.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The image display apparatus of the present invention will be described below in detail by way of some embodiments.

[First Embodiment]

Figure 1:
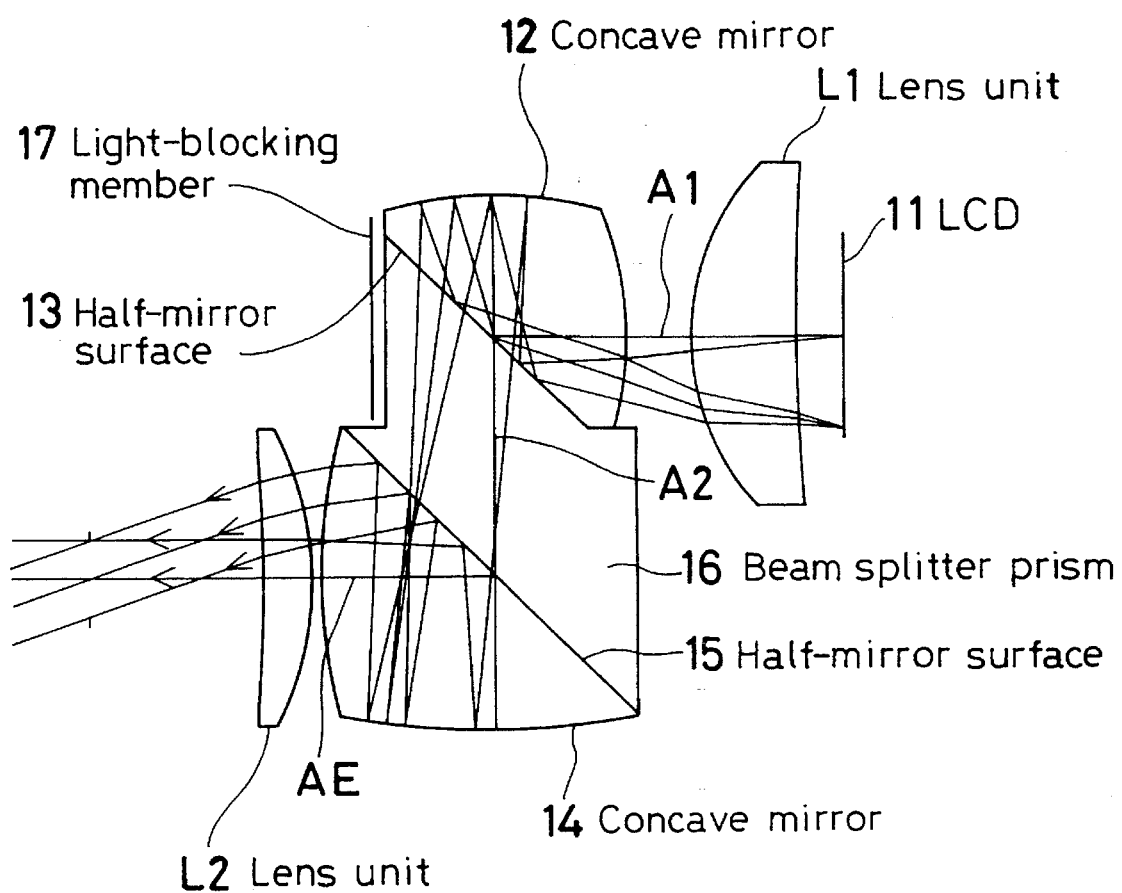
FIG. 1 illustrates the optical arrangement of the optical system of an image display apparatus according to a first embodiment of the present invention.

FIG. 1 illustrates the optical arrangement of the optical system of an image display apparatus according to a first embodiment of the present invention. The image display apparatus is composed of the following elements: an LCD 11 for forming an image; a first lens unit L1 disposed on the optical axis A1 of the LCD 11; a first magnifying reflecting mirror (concave mirror) 12 disposed on a second optical axis A2 perpendicularly intersecting the optical axis A1 of the LCD 11; a first half-mirror surface 13 disposed at a tilt on the intersection point of the optical axis A1 of the LCD 11 and the second optical axis A2 so that the first half-mirror surface 13 reflects a bundle of rays from the LCD 11 to the first magnifying reflecting mirror 12 and transmits the ray bundle reflected from the first magnifying reflecting mirror 12; a second magnifying reflecting mirror (concave mirror) 14 disposed to face the first magnifying reflecting mirror 12; a second half-mirror surface 15 disposed at a tilt on the intersection point of the second optical axis A2 and an observer's visual axis AE so that the second half-mirror surface 15 transmits the ray bundle reflected from the first magnifying reflecting mirror 12 to the second magnifying reflecting mirror 14 and reflects the ray bundle reflected from the second magnifying reflecting mirror 14 so as to project it into an observer's eyeball; and a second lens unit L2 of positive power disposed between the second half-mirror surface 15 and the eyeball. The first and second half-mirror surfaces 13 and 15 and the first and second magnifying reflecting mirrors 12 and 14 are integrated into a beam splitter prism 16.

In this embodiment, since the optical axis A1 of the LCD 11 is offset from the observer's visual axis AE, a light-blocking member 17 for blocking a bundle of rays passing through the first half-mirror surface 13 can be disposed without blocking the ray bundle reflected by the second half-mirror surface 15 and thus projected into the observer's eyeball. It should be noted that the entrance and exit surfaces of the beam splitter prism 16 that face the lens units L1 and L2, respectively, may be curved, as shown in the figure, so that these surfaces have some power.

In this embodiment, a viewing angle of 50°×38° can be obtained by using an LCD of 1.3 inches in diagonal size as the LCD 11.

Regarding the positional relationship between the first magnifying reflecting mirror 12 and the first half-mirror surface 13 and the positional relationship between the second magnifying reflecting mirror 14 and the second half-mirror surface 15, the following arrangements may be adopted:

With regard to the first magnifying reflecting mirror 12 and the first half-mirror surface 13, the latter may be disposed at a tilt on the intersection point of the optical axis A1 of the LCD 11 and the optical axis A2 of the first magnifying reflecting mirror 12 so that the first half-mirror surface 13 reflects the ray bundle from the LCD 11 to the first magnifying reflecting mirror 12 and transmits the ray bundle reflected from the first magnifying reflecting mirror 12 (see FIG. 1).

Alternatively, the first half-mirror surface 13 may be disposed at a tilt on the intersection point of the optical axis A1 of the first magnifying reflecting mirror 12 which is disposed to face the LCD 11 and the second optical axis A2 so that the first half-mirror surface 13 transmits a bundle of rays from the LCD 11 to the first magnifying reflecting mirror 12 and reflects the ray bundle reflected from the first magnifying reflecting mirror 12.

With regard to the positional relationship between the second magnifying reflecting mirror 14 and the second half-mirror surface 15, the latter may be disposed at a tilt on the intersection point of the optical axis of the second magnifying reflecting mirror 14, which is disposed on the optical axis A2 of the ray bundle emanating from the first half-mirror surface 13, and the observer's visual axis AE so that the second half-mirror surface 15 transmits the ray bundle reflected from the first magnifying reflecting mirror 12 to the second magnifying reflecting mirror 14 and reflects the ray bundle reflected from the second magnifying reflecting mirror 14 so as to project it into the observer's eyeball (see FIG. 1).

Alternatively, the second half-mirror surface 15 may be disposed at a tilt on the intersection point of the optical axis A2 of the ray bundle emanating from the first half-mirror surface 13 and the optical axis AE of the second magnifying reflecting mirror 14 which lies on the observer's visual axis AE so that the second half-mirror surface 15 reflects the ray bundle reflected from the first magnifying reflecting mirror 12 to the second magnifying reflecting mirror 14 and transmits the ray bundle reflected from the second magnifying reflecting mirror 14 so as to project it into the observer's eyeball.

Although in this embodiment the half-mirror surfaces 13 and 15 and the magnifying reflecting mirrors 12 and 14 are integrated into the prism 16, it is also possible to employ other arrangements: a combination of a half-mirror which uses no prism, and a concave mirror; a combination of a half-mirror which uses no prism, and a reverse reflecting mirror; a combination of a beam splitter prism and a concave mirror independent of the prism; a combination of a beam splitter prism and a reverse reflecting mirror independent of the prism; and so forth.

To increase the light utilization efficiency, it is preferable to form the first and second half-mirror surfaces 13 and 15 by using polarization beam splitters (PBS) and to dispose a quarter-wave plate between the first PBS 13 and the first magnifying reflecting mirror 12 and another quarter-wave plate between the second. PBS 15 and the second magnifying reflecting mirror f4. In general, light from the LCD 11 is linearly polarized light. Therefore, if the optical arrangement of this embodiment is so set that the axis of polarization of the ray bundle from the LCD 11 and the axis of polarization of the first PBS 13 intersect each other at right angles, almost all the ray bundle from the LCD 11 is reflected by the first PBS 13 to the first magnifying reflecting mirror 12. During the round-trip travel of the ray bundle to and from the first magnifying reflecting mirror 12, the direction of polarization is rotated through π/2 by the action of the quarter-wave plate disposed between the first PBS 13 and the first magnifying reflecting mirror 12. Therefore, almost all the ray bundle reflected from the first magnifying reflecting mirror 12 passes through the first PBS 13.

Since the ray bundle passing through the first PBS 13 is p-polarized light, if the axis of polarization of the second PBS 15 is set parallel to that of the first PBS 13, the ray bundle passes through the second PBS 15. During the round-trip travel of the ray bundle to and from the second magnifying reflecting mirror 14, the direction of polarization is rotated through π/2 by the action of the quarter-wave plate disposed between the second PBS 15 and the second magnifying reflecting mirror 14. Accordingly, almost all the ray bundle reflected from the second magnifying reflecting mirror 14 is reflected by the second PBS 15.

In a case where the axis of polarization of the LCD 11 and that of the first PBS 13 do not intersect each other at right angles, a polarization direction changing device should be inserted in the vicinity of the LCD 11.

In an arrangement wherein the axis of polarization of the first PBS 13 and that of the second PBS 15 cannot be made parallel to each other, a polarization direction changing device should be inserted in between the first and second PBSs 13 and 15.

If the prism side surface that lies on the observer's visual axis AE more away from the eyeball than the second half-mirror surface 15 is a half-mirror and a combination of a third lens unit and a shutter device is disposed on the observer's visual axis AE more away from the eyeball than the half-mirror, it becomes possible to observe an outside world image by opening the shutter device.

[ Second Embodiment]

Figure 2A:
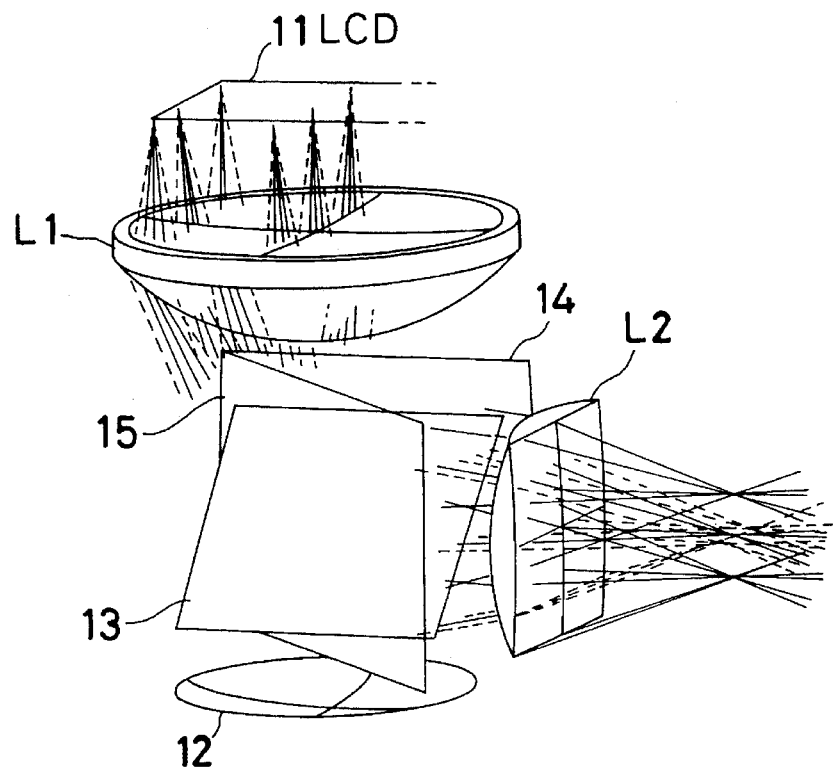
FIGS. 2(a) and 2(b) are perspective views of a second embodiment of the present invention.
Figure 2B:
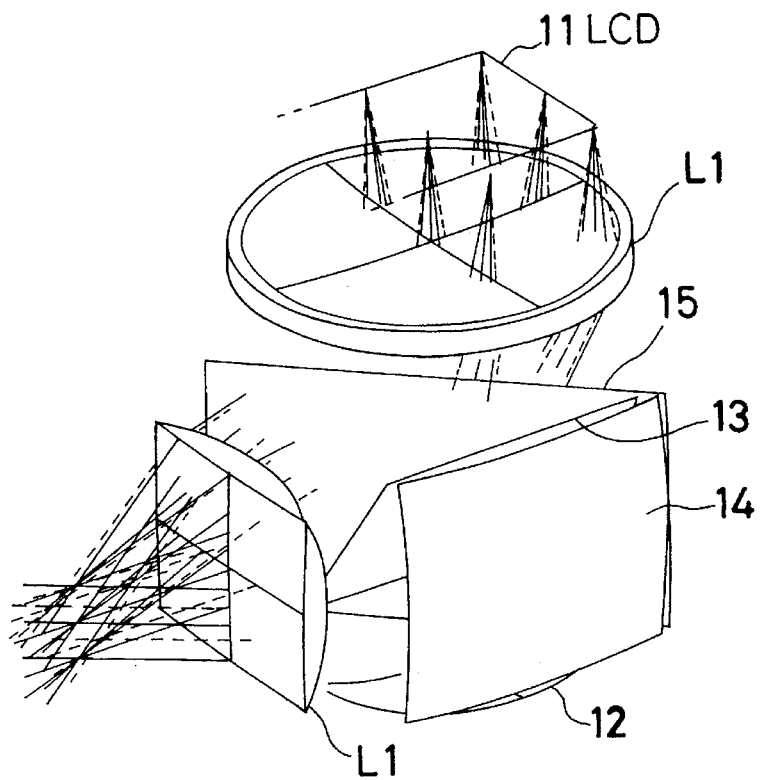

FIGS. 2(a) and 2(b) show a second embodiment of the present invention. FIG. 2(a) is a perspective view of the image display apparatus as viewed from the upper left-hand side thereof. FIG. 2(b) is a perspective view of the image display apparatus as viewed from the upper right-hand side thereof. The image display apparatus has the following constituent elements: an LCD 11 for forming an image; a first lens unit L1 disposed on the optical axis of the LCD 11; a first magnifying reflecting mirror 12 disposed to face the LCD 11; a first half-mirror surface 13 disposed at a tilt on the intersection point of the optical axis of the first magnifying reflecting mirror 12 and a second optical axis which perpendicularly intersects the optical axis of the first magnifying reflecting mirror 12 so that the first half-mirror surface 13 transmits a bundle of rays from the LCD 11 to the first magnifying reflecting mirror 12 and reflects the ray bundle reflected from the first magnifying reflecting mirror 12 to a second magnifying reflecting mirror 14 which is disposed on the second optical axis; a second half-mirror surface 15 disposed at a tilt on the intersection point of the second optical axis and an observer's visual axis so that the second half-mirror surface 15 reflects the ray bundle reflected from the second magnifying reflecting mirror 14 so as to project it into an eyeball of the observer; and a second lens unit L2 of positive power disposed between the second half-mirror surface 15 and the eyeball.

In this case, the center of the first half-mirror surface 13 and the center of the second half-mirror surface 15 are disposed at the same position, as illustrated in the figures, so that the optical axis of the LCD 11, the optical axis of the second magnifying reflecting mirror 14 and the observer's visual axis perpendicularly intersect each other at one point. Further, these optical elements are integrated into a beam splitter prism (not shown in the figures), and the observer's visual axis is placed in the plane of the first half-mirror surface 13. By virtue of this arrangement, the ray bundle emanating from the LCD 11 and reflected by the first half-mirror surface 13 can be practically prevented from directly entering the observer's eyeball.

By disposing the optical axis of the LCD 11 in the plane of the second half-mirror surface 15, as illustrated in the figures, the ray bundle emanating from the LCD 11 can be practically prevented from being directly reflected by the second half-mirror surface 15 to the observer's eyeball.

In this embodiment, a viewing angle of 50°×38° can be obtained by using an LCD of 1.3 inches in diagonal size as the LCD 11.

Although in this embodiment the half-mirror surfaces 13 and 15 and the magnifying reflecting mirrors 12 and 14 are integrated into a prism, it is also possible to employ other arrangements: a combination of a half-mirror which uses no prism, and a concave mirror; a combination of a half-mirror which uses no prism, and a reverse reflecting mirror; a combination of a beam splitter prism and a concave mirror independent of the prism; a combination of a beam splitter prism and a reverse reflecting mirror independent of the prism; and so forth.

[Third Embodiment]

Figure 3:
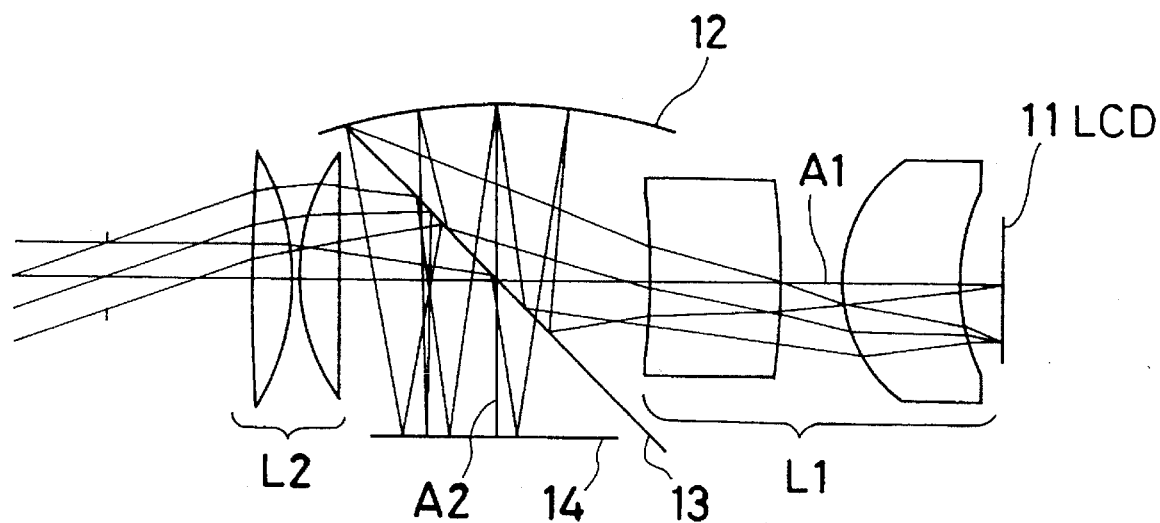
FIG. 3 illustrates the optical arrangement of a third embodiment of the present invention.

FIG. 3 illustrates the optical arrangement of a third embodiment of the present invention. In this embodiment, the image display apparatus is composed of the following elements: an LCD 11 for forming an image; a first lens unit L1 disposed on the optical axis A1 of the LCD 11; first and second reflecting mirrors 12 and 14 disposed to face each other on a second optical axis A2 which perpendicularly intersects the optical axis A1 of the LCD 11; a half-mirror 13 disposed at a tilt on the intersection point of the optical axis A1 of the LCD 11 and the second optical axis A2 so that the half-mirror 13 reflects a bundle of rays from the LCD 11 to the first reflecting mirror 12, transmits the ray bundle reflected from the first reflecting mirror 12 to the second reflecting mirror 14 and reflects the ray bundle reflected from the second reflecting mirror 14 so as to project it into an observer's eyeball; and a second lens unit L2 of positive power which is disposed between the half-mirror 13 and the eyeball. The first reflecting mirror 12 is a concave mirror having a positive power, while the second reflecting mirror 14 is a plane mirror.

In this embodiment, a view angle of 50°×38° can be obtained by using an LCD of 0.7 inches in diagonal size as the LCD 11.

[Fourth Embodiment]

Figure 4:
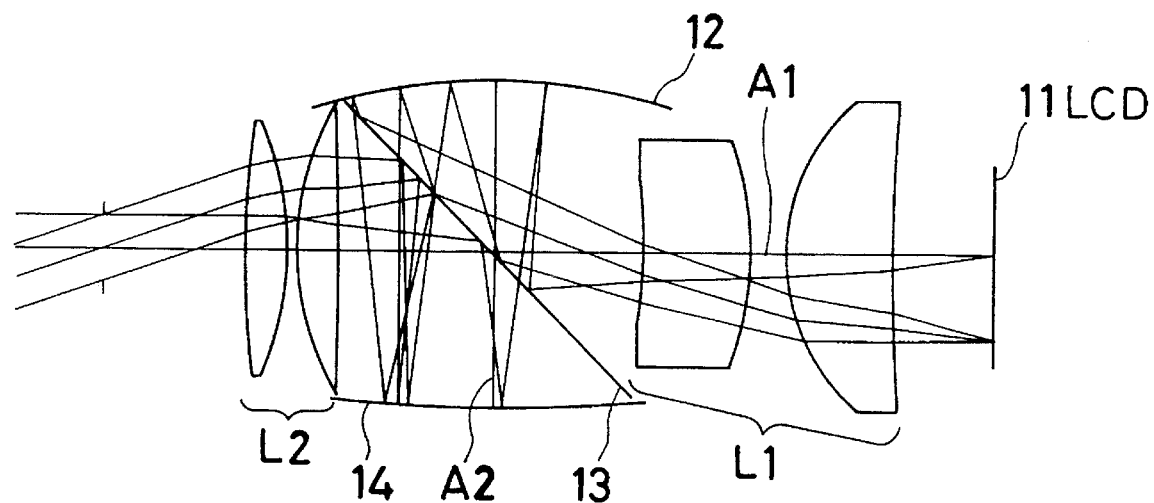
FIG. 4 illustrates the optical arrangement of a fourth embodiment of the present invention.

FIG. 4 illustrates the optical arrangement of a fourth embodiment of the present invention. This embodiment differs from the third embodiment only in that the second reflecting mirror 14 is a concave mirror having a positive power.

In this embodiment, a viewing angle of 50°×38° can be obtained by using an LCD of 1.3 inches in diagonal size as the LCD 11.

[Fifth Embodiment]

Figure 5:
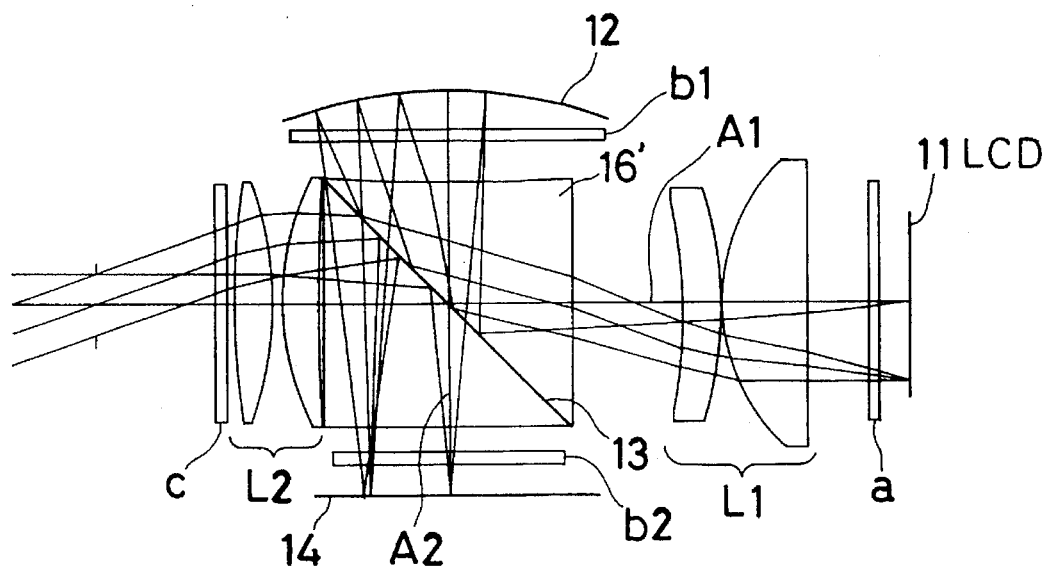
FIG. 5 illustrates the optical arrangement of a fifth embodiment of the present invention.

FIG. 5 illustrates the optical arrangement of a fifth embodiment of the present invention. There is a likelihood that a bundle of rays from the LCD 11 will pass through the half-mirror surface 13 and enter the observer's eyeball, causing flare, which has an unfavorable effect on the observation of the displayed image. To cope with this problem, in this embodiment, the half-mirror surface 13 is formed by using a PBS 16', and a polarizing plate c which transmits only s-polarized light is disposed in the vicinity of the observer's eyeball. Since flare light that passes through the PBS 16' and enters the eyeball is p-polarized light, such light can be cut off by the above-described arrangement.

Alternatively, the arrangement may be such that the beam splitter prism is formed by using a PBS 16', and quarter-wave plates b1 and b2 are disposed between the PBS 16' and the first and second magnifying reflecting mirrors 12 and 14, respectively. Since light from the LCD 11 is, in general, linearly polarized light, if the axis of polarization of the ray bundle from the LCD 11 and the axis of polarization of the PBS 16' are set so as to intersect each other at right angles, almost all of the ray bundle from the LCD 11 is reflected by the PBS 16' toward the first magnifying reflecting mirror 12. During the round-trip travel of the ray bundle to and from the first magnifying reflecting mirror 12, the direction of polarization is rotated through $\pi/2$ by the action of the quarter-wave plate b1 disposed between the PBS 16' and the first magnifying reflecting mirror 12. Thus, almost all of the ray bundle reflected from the first magnifying reflecting mirror 12 passes through the PBS 16'. It is the same at the second magnifying reflecting mirror 14. That is, during the round-trip travel of the ray bundle to and from the second magnifying reflecting mirror 14, the direction of polarization is rotated through $\pi/2$ by the action of the quarter-wave plate b2 disposed between the PBS 16' and the second magnifying reflecting mirror 14. Thus, almost all of the ray bundle reflected from the second magnifying reflecting mirror 14 is reflected by the PBS 16'.

Flare can be reduced even more effectively by inserting a polarizing plate in the vicinity of the LCD 11 (at the position a in FIG. 5) and another polarizing plate in the vicinity of the eyeball (at the position c in FIG. 5).

In a case where the axis of polarization of the LCD 11 and the axis of polarization of the PBS 16' do not intersect each other at right angles, a polarization direction changing device should be inserted in the vicinity of the LCD 11 (at the position a in FIG. 5).

In this embodiment, a viewing angle of 50°×38° can be obtained by using an LCD of 1.3 inches in diagonal size as the LCD 11.

[Sixth Embodiment]

Figure 6:
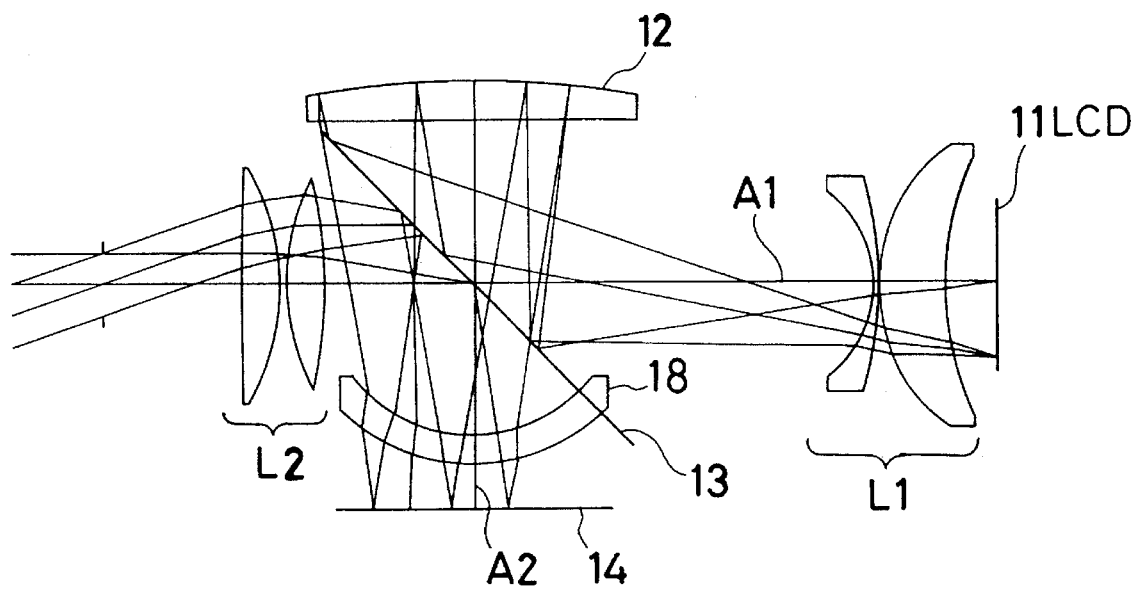
FIG. 6 illustrates the optical arrangement of a sixth embodiment of the present invention.

FIG. 6 illustrates the optical arrangement of a sixth embodiment of the present invention. This embodiment is similar to the third embodiment except that the first reflecting mirror 12 is a concave mirror of positive power which is formed by utilizing the reverse surface of a lens, and that a lens 18 of positive power is disposed in the vicinity of the second magnifying reflecting mirror 14.

In this embodiment, a viewing angle of 50°×38° can be obtained by using an LCD of 1.3 inches in diagonal size as the LCD 11.

[Seventh Embodiment]

Figure 7:
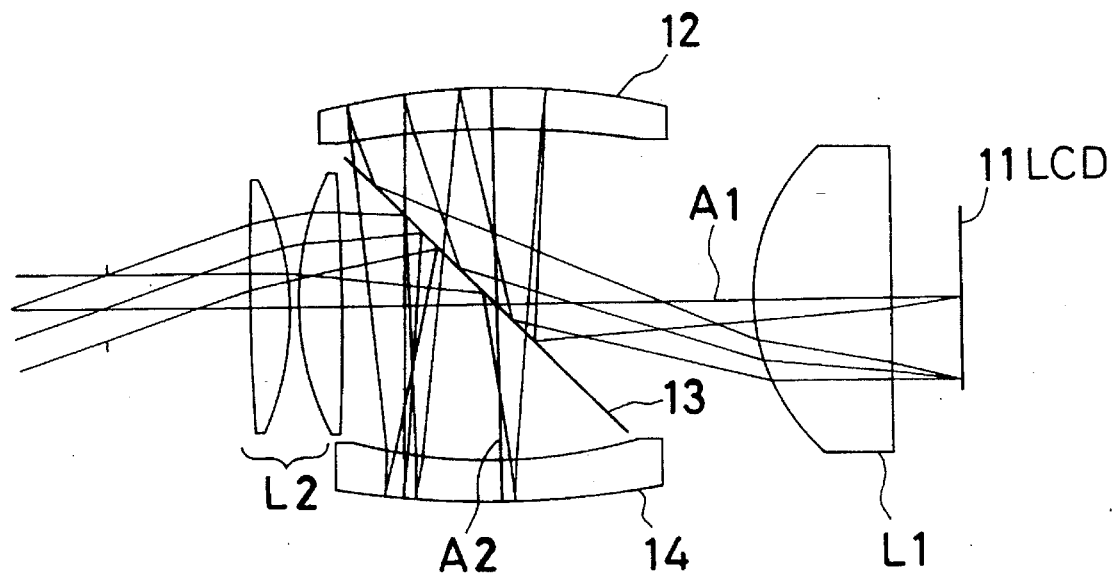
FIG. 7 illustrates the optical arrangement of a seventh embodiment of the present invention.

FIG. 7 illustrates the optical arrangement of a seventh embodiment of the present invention. This embodiment is similar to the third embodiment except that the first and second reflecting mirrors 12 and 14 are concave mirrors of positive power which are formed by utilizing the reverse surfaces of lenses, respectively.

In this embodiment, a viewing angle of 50°×38° can be obtained by using an LCD of 1.3 inches in diagonal size as the LCD 11.

[Eighth Embodiment]

Figure 8:
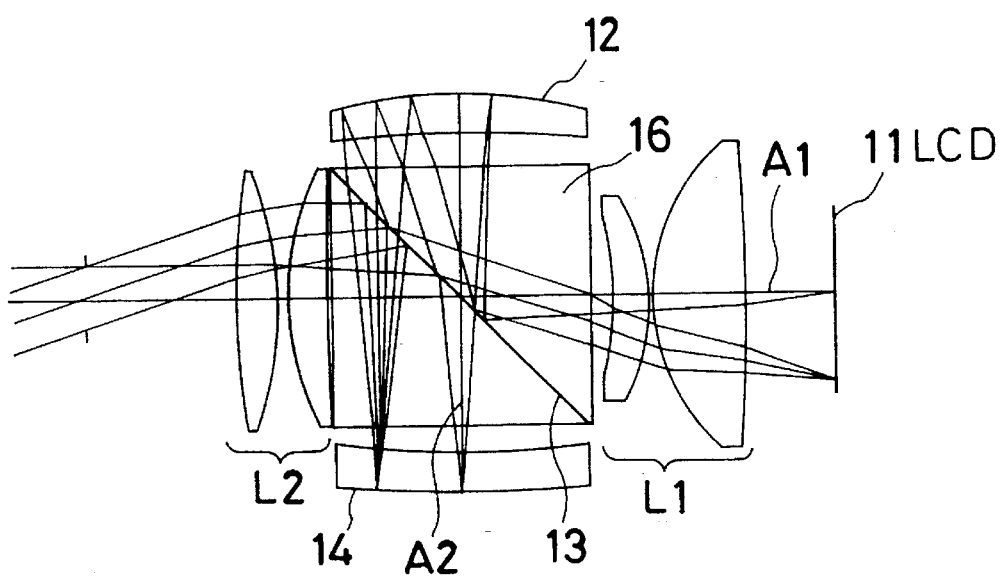
FIG. 8 illustrates the optical arrangement of an eighth embodiment of the present invention.

FIG. 8 illustrates the optical arrangement of an eighth embodiment of the present invention. This embodiment is similar to the seventh embodiment except that the half-mirror 13 is formed by using a beam splitter prism 16.

In this embodiment, a viewing angle of 50°×38° can be obtained by using an LCD of 1.3 inches in diagonal size as the LCD 11.

[Ninth Embodiment]

Figure 9:
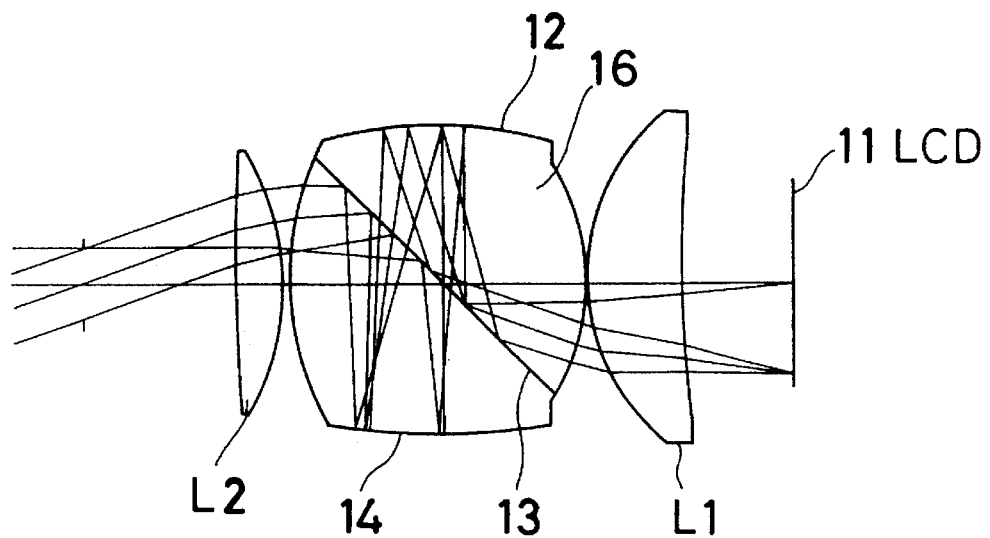
FIG. 9 illustrates the optical arrangement of a ninth embodiment of the present invention.

FIG. 9 illustrates the optical arrangement of a ninth embodiment of the present invention. This embodiment is a modification of the eighth embodiment. That is, the lenses that constitute the reverse reflecting mirrors 12 and 14 near the prism 16 in the eighth embodiment are integrated with the surfaces of the prism 16 which are opposite thereto, and those lenses in the lens units L1 and L2 which are adjacent to the prism 16 are also integrated with the surfaces of the prism 16 which are opposite thereto, thereby reducing the number of components.

In this embodiment, a viewing angle of 50°×38° can be obtained by using an LCD of 1.3 inches in diagonal size as the LCD 11.

[Tenth Embodiment]

Figure 10:
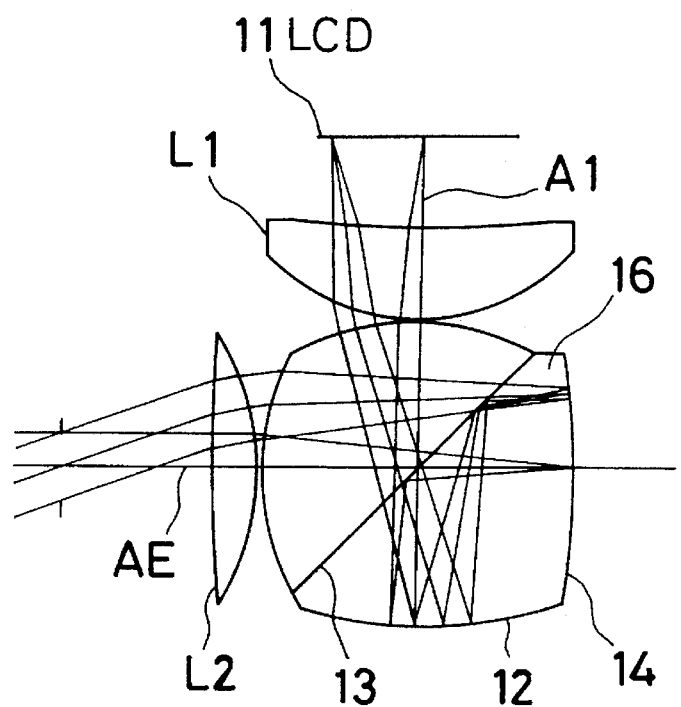
FIG. 10 illustrates the optical arrangement of a tenth embodiment of the present invention.

FIG. 10 illustrates the optical arrangement of a tenth embodiment of the present invention. In this embodiment, the image display apparatus is composed of the following elements: an LCD 11 for forming an image; a first lens unit L1 disposed on the optical axis A1 of the LCD 11; a first magnifying reflecting mirror 12 disposed to face the LCD 11; a second magnifying reflecting mirror 14 disposed on an observer's visual axis AE which perpendicularly intersects the optical axis A1 of the LCD 11; a half-mirror 13 disposed at a tilt on the intersection point of the optical axis A1 of the first magnifying reflecting mirror 12 and the optical axis AE of the second magnifying reflecting mirror 14 so that the half-mirror 13 transmits a bundle of rays from the LCD 11 to the first magnifying reflecting mirror 12, reflects the ray bundle reflected from the first magnifying reflecting mirror 12 to the second magnifying reflecting mirror 14, and transmits the ray bundle reflected from the second magnifying reflecting mirror 14 so as to project it into an observer's eyeball; and a second lens unit L2 of positive power which is disposed between the half-mirror 13 and the eyeball. The half-mirror 13 and the first and second magnifying reflecting mirrors 12 and 14 are integrated into a prism 16.

In this embodiment, a viewing angle of 50°×38° can be obtained by using an LCD of 1.3 inches in diagonal size as the LCD 11.

In this embodiment, if the second magnifying reflecting mirror 14 is a half-mirror and a combination of a third lens unit and a shutter device is disposed on the observer's visual axis AE more away from the eyeball than the second magnifying reflecting mirror 14, it becomes possible to observe an outside world image by opening the shutter device.

Although in this embodiment the half-mirror 13 and the magnifying reflecting mirrors 12 and 14 are integrated into the prism 16, it is also possible to employ other arrangements: a combination of a half-mirror which uses no prism, and a concave mirror; a combination of a half-mirror which uses no prism, and a reverse reflecting mirror; a combination of a beam splitter prism and a concave mirror independent of the prism; a combination of a beam splitter prism and a reverse reflecting mirror independent of the prism; and so forth.

In this case also, a bundle of rays from the LCD 11 may be reflected by the half-mirror surface 13 and enter the observer's eyeball, causing flare, which has an unfavorable effect on the observation of the displayed image. To cope with this problem, the arrangement may be modified as follows: The beam splitter prism 16 is formed by using a PBS, and a polarizing plate which transmits only p-polarized light is disposed in the vicinity of the observer's eyeball. Since light that is reflected by the PBS and enters the eyeball as flare light is s-polarized light, such light can be cut off by the above-described arrangement.

Alternatively, the arrangement may be such that the beam splitter prism 16 is formed by using a PBS, and quarter-wave plates are disposed between the PBS and the first and second magnifying reflecting mirrors 12 and 14, respectively. Since light from the LCD 11 is, in general, linearly polarized light, if the axis of polarization of the ray bundle from the LCD 11 and the axis of polarization of the PBS are set so as to be parallel to each other, almost all the ray bundle from the LCD 11 passes through the PBS and travels toward the first magnifying reflecting mirror 12. During the round-trip travel of the ray bundle to and from the first magnifying reflecting mirror 12, the direction of polarization is rotated through π/2 by the action of the quarter-wave plate disposed between the PBS and the first magnifying reflecting mirror 12. Thus, almost all of the ray bundle reflected from the first magnifying reflecting mirror 12 is reflected by the PBS. It is the same at the second magnifying reflecting mirror 14. That is, during the round-trip travel of the ray bundle to and from the second magnifying reflecting mirror 14, the direction of polarization is rotated through π/2 by the action of the quarter-wave plate disposed between the PBS and the second magnifying reflecting mirror 14. Thus, almost all of the ray bundle reflected from the second magnifying reflecting mirror 14 passes through the PBS.

Flare can be reduced even more effectively by inserting a polarizing plate in the vicinity of the LCD 11 and another polarizing plate in the vicinity of the eyeball.

In a case where the axis of polarization of the LCD 11 and the axis of polarization of the PBS cannot be made parallel to each other, a polarization direction changing device should be inserted in the vicinity of the LCD 11.

Figure 11A:
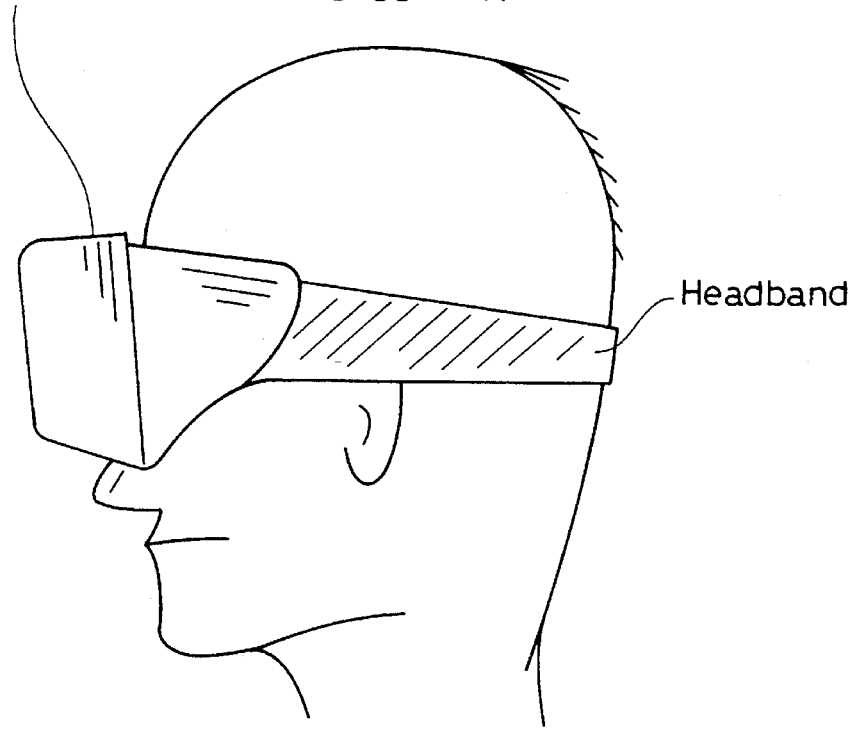
FIGS. 11(a) and 11(b) are perspective and sectional views showing a face-mounted goggle type image display apparatus incorporating the optical system of the tenth embodiment when it is fitted to the user's face.
Figure 11B:
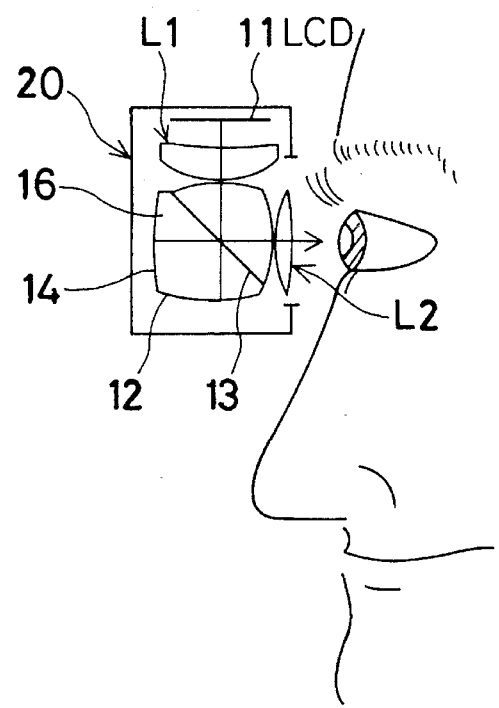
Figure 12:
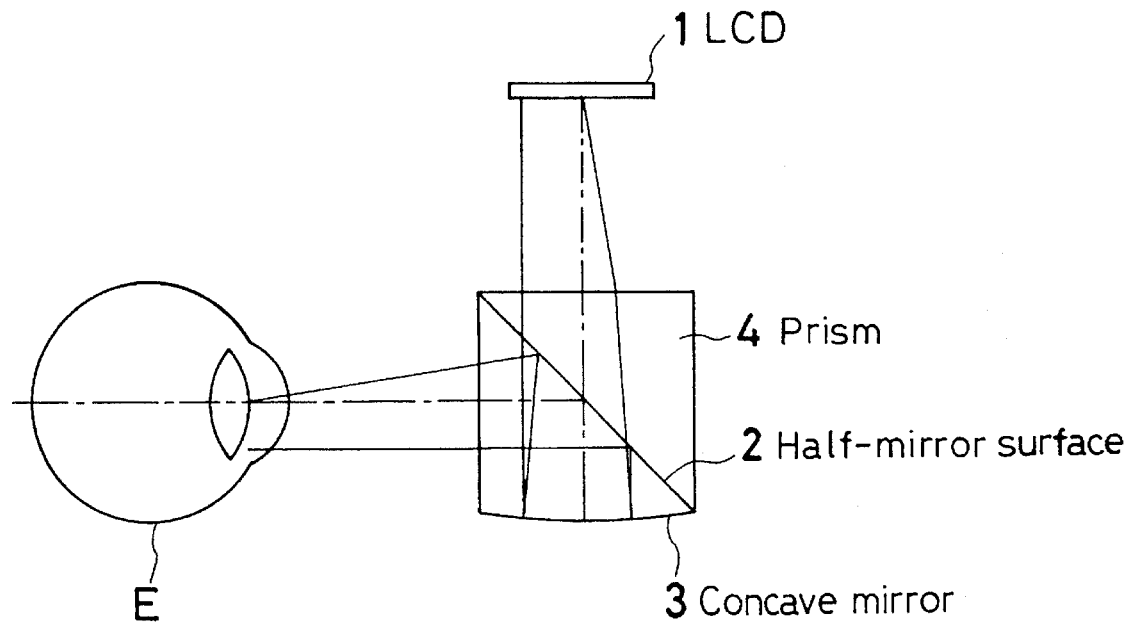
FIG. 12 illustrates the optical arrangement of one example of conventional projection optical systems.
Figure 13:
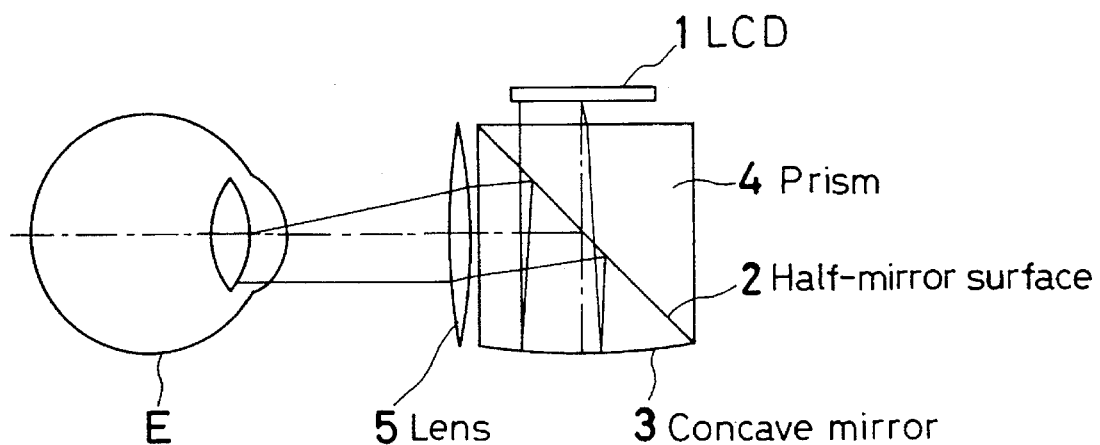
FIG. 13 illustrates the optical arrangement of another example of conventional projection optical systems.

FIGS. 11(a) and 11(b) are perspective and sectional views showing the image display apparatus of the present invention as arranged in the form of a face-mounted goggle type image display apparatus 20, which is fitted to the user's face. In the illustrated example, the image display apparatus 20 employs the optical system of the tenth embodiment shown in FIG. 10.

Although the image display apparatus of the present invention has been described above by way of some embodiments, it should be noted here that the present invention is not necessarily limited to the described embodiments and that various changes and modifications may be imparted thereto.

As will be clear from the foregoing description, it is possible according to the present invention to avoid interference between the image display device and the semitransparent mirror and to widen the viewing angle without any problem simply by changing the relay optical system. Thus, it is possible to provide a compact wide-viewing angle image display apparatus which enables aberration correction to be made even more efficiently by a coaxial arrangement.

What we claim is:

1. An image display apparatus comprising:
a face-mounted unit body including:

an image display device for forming an image, a first half-mirror provided on an optical axis of said image display device, a first mirror provided to form a first turn-back optical path in cooperation with said first half-mirror, a second half-mirror facing said first half-mirror, and a second mirror provided to form a second turn-back optical path in cooperation with said second half-mirror; and means for supporting said face-mounted unit body on an observer's head so that said face-mounted unit body can be fitted to an observer's face.

2. An image display apparatus comprising: a face-mounted unit body including:

an image display device for forming an image, a first half-mirror provided on an optical path of said image display device, a second half-mirror provided to intersect said first half-mirror, a first mirror to form a first turn-back optical path for a bundle of light rays passing through said first half-mirror, and a second mirror to form a second turn-back optical path for a bundle of light rays successively reflected by said first mirror and said first half-mirror and passing through said second half-mirror; and means for supporting said face-mounted unit body on an observer's head so that said face-mounted unit body can be fitted to an observer's face.

3. An image display apparatus according to claim 1 or 2, further comprising:

an optical member of positive power, said optical member being provided between said image display device and said first half-mirror.

4. An image display apparatus according to claim 1 or 2, wherein:

said first half-mirror, said first mirror, and said second mirror are formed from a prism.

5. An image display apparatus according to claim 1 or 2, wherein said first half-mirror is a polarization beam splitter, said image display apparatus further comprising:

polarization discriminating means disposed on said optical path of said bundle of light rays passing through said first half-mirror.

6. An image display apparatus according to claim 1 or 2, wherein said first half-mirror and said second half-mirror are formed from a polarization beam splitter, said image display apparatus further comprising:

polarization direction changing means disposed between said polarization beam splitter and said first mirror and between said polarization beam splitter and said second mirror, said polarization direction changing means rotating a direction of polarization of said bundle of rays through $\pi/2$ during round-trip travel of said bundle of rays through said polarization direction changing means to and from at least one of said first mirror and said second mirror.

7. An image display apparatus according to claim 1 or 2, wherein:

said first mirror is a concave mirror having positive power.

8. An image display apparatus according to claim 1 or 2, wherein:

said second mirror is a concave mirror having positive power.

* * * * *